United States Patent [19]

Wolf et al.

[11] Patent Number: 4,899,811
[45] Date of Patent: Feb. 13, 1990

[54] COOLING ROLL

[75] Inventors: Robert Wolf, Herbrechtingen; Heinrich Schmid, Steinheim, both of Fed. Rep. of Germany

[73] Assignee: J. M. Voith GmbH, Heidenheim, Fed. Rep. of Germany

[21] Appl. No.: 300,775

[22] Filed: Jan. 23, 1989

[30] Foreign Application Priority Data

Jan. 28, 1988 [DE] Fed. Rep. of Germany ....... 3802477

[51] Int. Cl.⁴ .......................... F28F 5/02; F28D 11/02
[52] U.S. Cl. ........................................ 165/89; 34/119; 34/124
[58] Field of Search .................... 165/89, 90; 34/119, 34/124

[56] References Cited

U.S. PATENT DOCUMENTS

| 4,252,184 | 2/1981 | Appel | 165/89 |
| 4,498,527 | 2/1985 | Gerarts | 165/89 |
| 4,545,425 | 10/1985 | Johansson | 165/89 |
| 4,688,335 | 8/1987 | Krill | 165/89 X |

FOREIGN PATENT DOCUMENTS 3229471 8/1986 Fed. Rep. of Germany .
242852 2/1987 Fed. Rep. of Germany .

Primary Examiner—Alan Cohan
Attorney, Agent, or Firm—Albert L. Jeffers; Richard L. Robinson

[57] ABSTRACT

On the cooling roll with outer roll shell 7 and inner, preforated roll shell 8 of an inner body 6, the inner body features endways and centrally at least one distributing component 22. Extending through this distributing component are channels 19 that are parallel with the roll axis, for one, and interposed radial channels 28 which, for one, serve the connection of an endwise space 14 that is located between an axial end of the inner body and the hollow roll end with one of the coaxial supply or drain channels of the journal 20 and, for another, serve the connection of the interior space 3 of the inner body 6 with one of the other coaxial supply and drain channels 25, 26 or vice versa.

7 Claims, 2 Drawing Sheets

Fig. 3
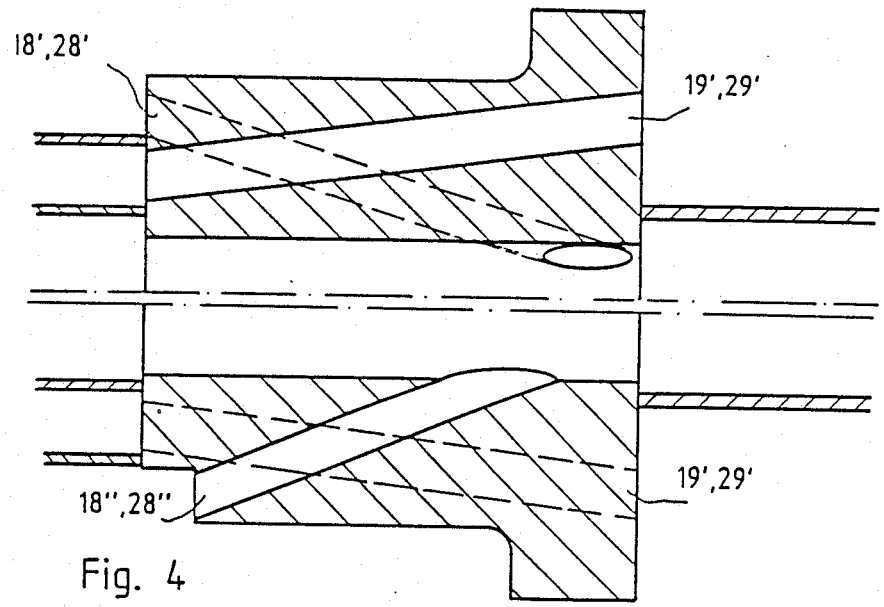
Fig. 4
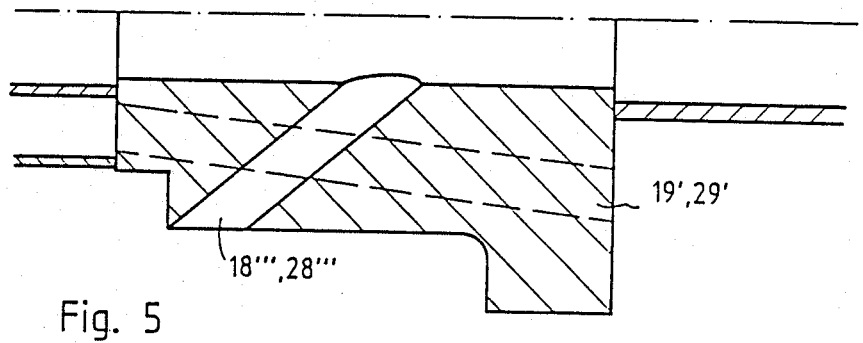
Fig. 5

COOLING ROLL

BACKGROUND OF THE INVENTION

The invention concerns a cooling roll having the shape of a hollow cylinder. An inner body also having the shape of a hollow cylinder has an inner roll shell which features, distributed across its length and circumference, holes for the passage of coolant into an annular space formed between the inner body and an outer roll shell. The annular space is followed by spaces formed endways between radial support disks of the hollow roll and the inner body, in the central area of which annular space the supply and drain channels extend coaxially to at least one journal supporting the cooling roll. Cooling rolls of this type are used, e.g., in paper machines, for instance before the sizing press, or in paper processing machines, for instance in coaters, where the paper web runs over part of the circumference of the rotating cooling roll.

Such a cooling roll is known from the East German patent document 24 28 52.

SUMMARY OF THE INVENTION

The problem underlying the invention is to provide a cooling roll which at a good cooling capacity features a simple design and enables both the supply and draining of the coolant through a single journal, with the aid of which the cooling roll is mounted.

This problem is solved by the features of the present invention.

At first, it had been feared that the inventional design would involve the risk that the temperature distribution on the outer roll shell would not be sufficiently uniform across the roll length. It was believed that the coolant, picking up heat and flowing essentially in axially parallel direction down the inside surface of the roll shell toward the roll end, would in the area of the roll ends interfere with the outflow of fresh coolant from the orifices. But such misgivings proved to be unjustified. Apparently, what happens is that the coolant flowing out of the holes and being still cold is in all areas of the roll length forced on the inside surface of the outer roll shell, by centrifugal force, due to its higher specific gravity. As a result, the already heated and returning coolant is forced on the outside surface of the inner shell and, thus, cannot interfere with the effect of the fresh coolant which is entering the annular space.

In a further favorable development of the invention, the ratio of annular gap clearance and inside diameter of the outer roll shell ranges between 1/80 and 1/500.

A further optimization can be achieved by putting the number and size of the orifices arranged in the inside shell at an especially favorable ratio to the clearance of the annular gap and to the inside diameter of the outer roll shell. In other words: the sum of the discharge cross sections of all orifices arranged in the inside shell is put at a specific ratio to the flow cross section in the annular gap, viewed in axial direction. It was recognized that this ratio preferably should be so selected that the flow velocity through the orifices amounts to about 2 to 5 times the flow velocity (which essentially is directed axially parallel) of the coolant through the annular gap.

Although theoretically the best uniformity of temperature distribution could be achieved through an extremely high number of orifices and thus extremely small orifice diameters, the smallest practically usable whole diameter is about 3 mm. Small diameters involve the risk that dirt particles will gradually clog the orifices.

The invention is using the arrangement known from the German patent document 32 29 471, where both the supply line and a single drain line serving the removal of the entire heated coolant are arranged on one and the same roll end. This preferred arrangement can be realized also on the inventional cooling roll, by connecting the disk-shaped space located on the one roll end through a part of the drain line that extends through the roll body with the disk-shaped space located on the other roll end. In this context it is suitable when the supply line and drain line extending through the roll body are arranged coaxially with each other and coaxially with the roll body. To that end, there are two possibilities: the supply line will preferably be arranged coaxially within the drain line. But it is also possible to arrange the drain line coaxially within the supply line.

BRIEF DESCRIPTION OF THE DRAWINGS

Two exemplary embodiments of the invention will be described hereafter with the aid of the drawings.

FIG. 3 shows a partial longitudinal section through a third embodiment.

FIG. 4 shows a partial longitudinal section through a 4th embodiment; and

FIG. 5 shows a partial longitudinal section through a 5th embodiment.

DETAILED DESCRIPTION OF THE PREFERRED EMBODIMENTS

Figure 1:
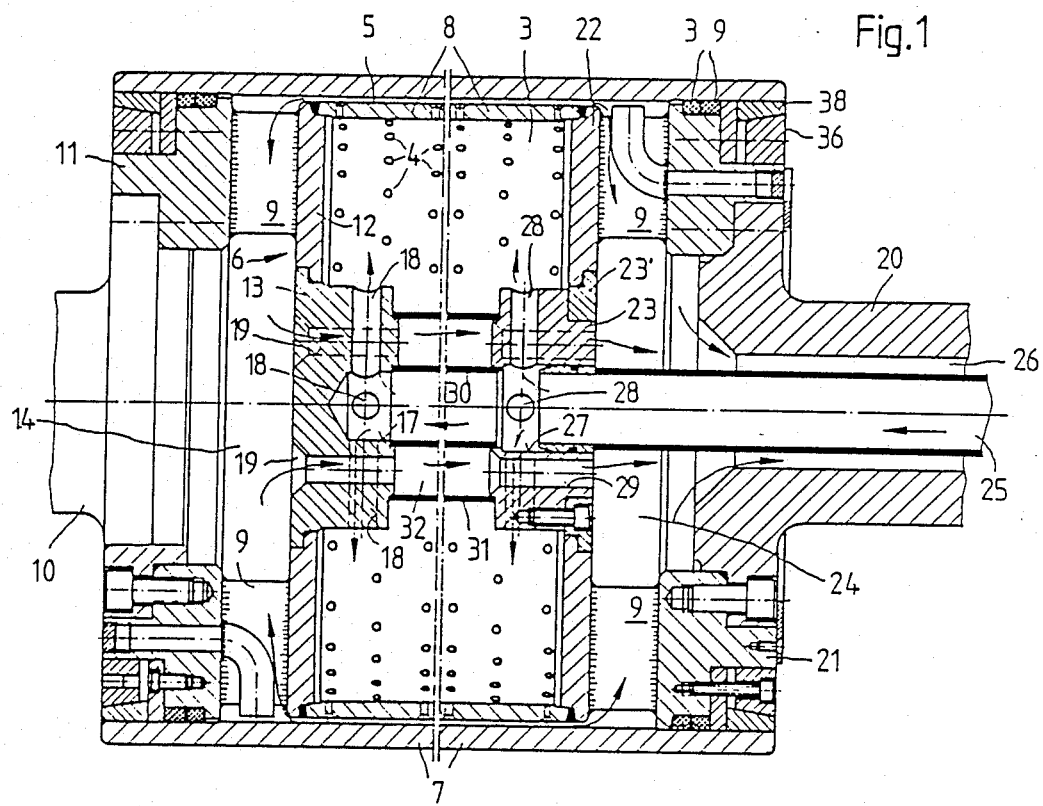
FIG. 1 shows a longitudinal section through a first embodiment.

On the one end of the cooling roll, a massive roll journal 10 is bolted to an outer support disk 11. On the other roll end, a hollow roll journal 20 is bolted to an outer support disk 21. Fastened on each outer support disk 11, 21, through several connecting ribs 9, is an inner support disk 12, 22. An inner, perforated roll shell 8 is welded to the circumference of these two inner support disks. Thus, the latter components 8, 12 and 22 form an inner body 6 for distribution and guidance of the coolant with a central interior space 3.

With the aid of known clamping ring arrangements 36, 38, an outer roll shell 7 is fastened on the outer support disks 11 and 21 and sealed on these by means of rubber O-rings 39. Remaining between the outer roll shell 7 to be cooled and the inner, perforated roll shell 8 is a relatively narrow annular gap 5.

A single-piece central distributing component 13 is fitted endways in the center of the one inner support disk 12 (which is coordinated with the massive journal 10) according to FIG. 1. Similarly, a central distributing component 23 is fitted endways in the center of the other inner support plate 22, but with the aid of a separate flange 23'. Two coaxially nested pipes 30 and 31 extend from the one distributing component 13 to the other distributing component 23. The inside diameter of the outer pipe 31 is about twice as large as the outside diameter of the inner pipe 30.

In both embodiments, the interior space 3 defined by the perforated inner roll shell 8 and inner support disks 12 and 22 is charged with coolant which through the large number of orifices 4 enters the annular space 5. The orifices 4 are preferably round bores. They may be flared at the outer end. Essential is that they are present in a large number while their diameter is relatively small (in the order of 5 mm). Essential is also that they are distributed maximally uniformly across the roll length and maximally uniformly across the circumference.

In FIG. 1, fresh coolant flows first through a line 25 which extends coaxially through the hollow roll journal 20, with an annular space 26 remaining between these two components as part of the drain system for the heated coolant. The line 25 extends up into and communicates with a passage bore 27 of the distributing component 23 and communicates through said inner pipe 30 with a blind bore 17 of the distributing component 13. Both distributing components 13 and 23 have several radial channels 18 respectively 28 through which the coolant passes into the interior space 3 that is enveloped by the inner roll shell 8.

Thus, the still cold coolant flows in the form of many uniformly distributed radial jets at the inside surface of the outer roll shell 7. From there it proceeds down the outer surface of the inner shell 8, partly toward the one roll end and partly toward the other roll end, and there into a disk-shaped space 14 respectively 24 that is located between the outer support disk 11 respectively 21 and the inner support disk 12 respectively 22. Both distributing components 13 and 23 comprise between the radial channels 18 and 28 several axially parallel channels 19 respectively 29 which connect the disk-shaped space 14 respectively 24 with the annular space 32 located between the two pipes 30 and 31. Thus, the part of the heated coolant which in the area of the massive roll journal 10 proceeds into the disk-shaped space 14 can through the said channels 19 and 29 flow toward the other roll end into the space 24. It unites there with the other part of the heated coolant, which now leaves the cooling roll through the hollow roll journal 20 (annular space 26).

Figure 2:
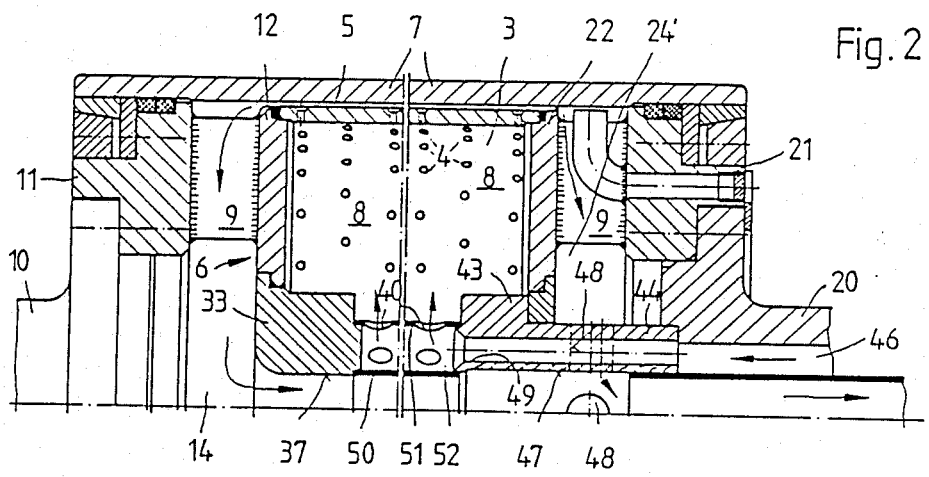
FIG. 2 shows a partial longitudinal section through a second embodiment.

In variation from FIG. 1, FIG. 2 provides for the following:

The distributing component 43 located in the area of the hollow roll journal 20 has an extension 44 that extends into the hollow roll journal, and in it are provided several axially parallel channels 49 which connect the annular space 46 contained in the roll journal 20 with the annular space 52 contained between the pipes 50 and 51.

The outer pipe 51 has several uniformly distributed orifices 40. Thus, the fresh coolant can flow through the just mentioned annular spaces 46 and 52 into the interior space 3. In FIG. 2, both distributing components 33 and 43 have each a central passage channel 37 respectively 47 which now, along with the central inner pipe 50 (and together with the pipe 45 arranged in the hollow roll journal 20), serve the draining of the heated coolant from the endways spaces 14 and 24'. To that end, the distributing component 43 features several radial channels 48 in the area of the hollow roll journal 20.

Several alternative arrangements of channels 18, 28 and 19, 29 are shown in FIG. 3, 4 and 5. In one such arrangement, channels 18', 28' have an end opening beginning at the radially inner circumferential surface of the distributing component. The other end opening is on a radially extending surface of the distributing component and communicates with the interior space 3. A variation illustrated as channels 18'', 28'' involves an angle of inclination of the channels which is more nearly radial and the other end opening is on a recessed radially extending surface. The variation labeled 18''', 28''' involves a further decrease in the inclination of the channel from a radial plane and the other end opening is on an outer circumferential surface of the distributing component. Channels 19', 29' are inclined at an angle such that they are not strictly parallel to the axis of the roll.

It is preferred that channels 19, 29, 49 are either axial or inclined at least 75° with respect to a radial plane. Channels 18, 28, 48 are preferably either totally or partly radial or inclined at most by 65° with respect to a radial plane.

What is claimed is:

1. A cooling roll comprising:
a hollow outer roll shell;
a pair of spaced outer radial support disks supporting said outer roll shell;
a pair of journals each supporting one of said pair of outer radial support disks;
a hollow inner body disposed within said outer roll shell and between said pair of outer radial support disks, said inner body having an inner roll shell defining in part a central interior space, said outer roll shell and the inner roll shell defining an annular space therebetween, the inner roll shell having distributed across the length and circumference thereof holes communicating the hollow inner body with the annular space for the passage of coolant into the annular space;
said pair of outer radial support disks and said hollow inner body defining therebetween a pair of disk-shaped end spaces each at an axial end of said inner body, said disk-shaped spaces communicating with the annular space;
a supply channel and a drain channel, one disposed radially outside the other, each extending coaxially from the hollow inner body to one journal supporting the cooling roll; and
a central distributing component at one axial end of the inner body proximate said one journal, in which distributing component first channels are disposed at an inclination of at least 75° with respect to a radial plane and connect one of said central interior space and said end spaces with the coaxial supply channel, and in which distributing component second channels are disposed at an inclination of at most 65° with respect to a radial plane, said second channels being between said first channels and connecting the other of said central interior space and said end spaces with the coaxial drain channel.

2. Cooling roll according to claim 1, in which a second distributing component is located at the other axial end of the inner body, and has radial channels and channels that are parallel with the roll axis, the latter connecting the end space away from said one journal through a connecting pipe between the two distributing components with the end space proximate said one journal, the connecting pipe enveloping an inner supply pipe which connects the two distributing components.

3. Cooling roll according to claim 1, in which the inner body is rigidly connected with the outer support disks through radial connecting ribs.

4. Cooling roll according to claim 2, in which the inner body is rigidly connected with the outer support disks through radial connecting ribs.

5. A cooling roll comprising:
a hollow outer roll shell;

a pair of spaced outer radial support disks supporting said outer roll shell;

a pair of journals each supporting one of said pair of outer radial support disks;

a hollow inner body disposed within said outer roll shell and between said pair of outer radial support disks, said inner body having an inner roll shell defining in part a central interior space, said outer roll shell and the inner roll shell defining an annular space therebetween, the inner roll shell having distributed across the length and circumference thereof holes communicating the hollow inner body with the annular space for the passage of coolant into the annular space;

said pair of outer radial support disks and said hollow inner body defining therebetween a pair of disk-shaped end spaces each at an axial end of said inner body, said disk-shaped spaces communicating with the annular space;

a supply channel and a drain channel, one disposed radially outside the other, each extending coaxially from the hollow inner body to one journal supporting the cooling roll; and a central distributing component at one axial end of the inner body proximate said one journal, said central distributing component having radially extending surfaces and an inner circumferential surface, in which distributing component first channels are disposed having end openings substantially on the radially extending surfaces and connect one of said central interior space and said end spaces with the coaxial supply channel, and in which distributing component second channels are disposed having an end opening beginning at said inner circumferential surface, said second channels being between said first channels and connecting the other of said central interior space and said end spaces with the coaxial drain channel.

6. Cooling roll according to claim 5, in which the central distributing component has an outer circumferential surface and said second channels have another end opening ending at the outer circumferential surface.

7. Cooling roll according to claim 6, in which said second channels are inclined at an angle at least 10° less than the angle of inclination of said first channels with respect to a radial plane.

* * * * *